(12) United States Patent
Anbarasu (10) Patent No.: US 9,360,916 B2
(45) Date of Patent: Jun. 7, 2016

(54) TRANSITION AN INPUT/OUTPUT DEVICE

(75) Inventor: V. Anbarasu, Karnataka (IN)

(73) Assignee: Hewlett Packard Development Company, L.P., Houston, TX (US)

( * ) Notice: Subject to any disclaimer, the term of this patent is extended or adjusted under 35 U.S.C. 154(b) by 781 days.

(21) Appl. No.: 12/877,287

(22) Filed: Sep. 8, 2010

(65) Prior Publication Data

US 2012/0059955 A1 Mar. 8, 2012

(51) Int. Cl.
*G06F 1/32* (2006.01)

(52) U.S. Cl.
CPC .............. *G06F 1/3209* (2013.01); *G06F 1/325* (2013.01); *G06F 1/3287* (2013.01); *Y02B 60/1282* (2013.01)

(58) Field of Classification Search
CPC ...... G06F 1/3209; G06F 1/325; G06F 1/3287
USPC .......................................................... 710/15
See application file for complete search history.

(56) References Cited

U.S. PATENT DOCUMENTS

| 7,103,788 B1 * | 9/2006 | Souza et al. | 713/323 |
| 7,197,579 B2 * | 3/2007 | Saito et al. | 710/15 |
| 7,206,833 B1 * | 4/2007 | Sarangam et al. | 709/224 |
| 2004/0172489 A1 * | 9/2004 | Shikada | 710/15 |
| 2007/0294556 A1 * | 12/2007 | Wutka | 713/324 |
| 2010/0218012 A1 * | 8/2010 | Joseph et al. | 713/310 |
| 2010/0274903 A1 * | 10/2010 | Wookey et al. | 709/227 |

FOREIGN PATENT DOCUMENTS

| WO | WO-2008154726 A1 | 12/2008 | |
| WO | WO 2008154726 A1 * | 12/2008 | G06F 21/00 |

OTHER PUBLICATIONS

Web page definition of "device driver" Oct. 10. 2008; BusinessDictionary.com—http://www.businessdictionary.com/definition/device-driver.html#ixzz27hylkVtS.*
Web page definition of device driver Encyclopedia Britannica Online Mar. 27, 2013 http://www.britannica.com/EBchecked/topic/899785/driver.*
Sanjeev Mishra, Program To Automatically Turn Off Monitor When PC Is Locked, Jul. 14, 2009, http://www.clickonf5.org/software/program-automatically-turnoff-monitor-lock/2949.

* cited by examiner

*Primary Examiner* — Idriss N Alrobaye
*Assistant Examiner* — Ronald Modo
(74) *Attorney, Agent, or Firm* — HP Inc. Patent Department (57) ABSTRACT

Managing an input/output device including receiving a request to remotely connect a computing machine with a device, detecting an signal to power down the input/output device of the computing machine in response to establishing a remote connection with the device, and transitioning the input/output device from a first power state to second power state in response to detecting the signal.

20 Claims, 7 Drawing Sheets

TRANSITION AN INPUT/OUTPUT DEVICE

BACKGROUND

When managing an input/output device, a user can access the input/output device and proceed to power on the input/output device when the user would like to use the input/output device. Additionally, the user can power off the input/output device when the input/output device will not be used. Alternatively, a computing machine can detect when a user is directly accessing the computing machine and proceed to transition the input/output between one or more power states device in response to the user directly accessing the computing machine.

BRIEF DESCRIPTION OF THE DRAWINGS

Various features and advantages of the disclosed embodiments will be apparent from the detailed description which follows, taken in conjunction with the accompanying drawings, which together illustrate, by way of example, features of the disclosed embodiments.

DETAILED DESCRIPTION

By detecting a request to remotely couple a computing machine with a device, a remote connection between the computing machine and the device can efficiently and conveniently be established. Additionally, by transitioning an input/output device of the computing machine from a first power state to a second power state in response to detecting a signal to power down the input/output device, an amount of power utilized by the computing machine or the input/output device can be efficiently used and managed while the device is remotely connected to the computing machine.

Figure 1:
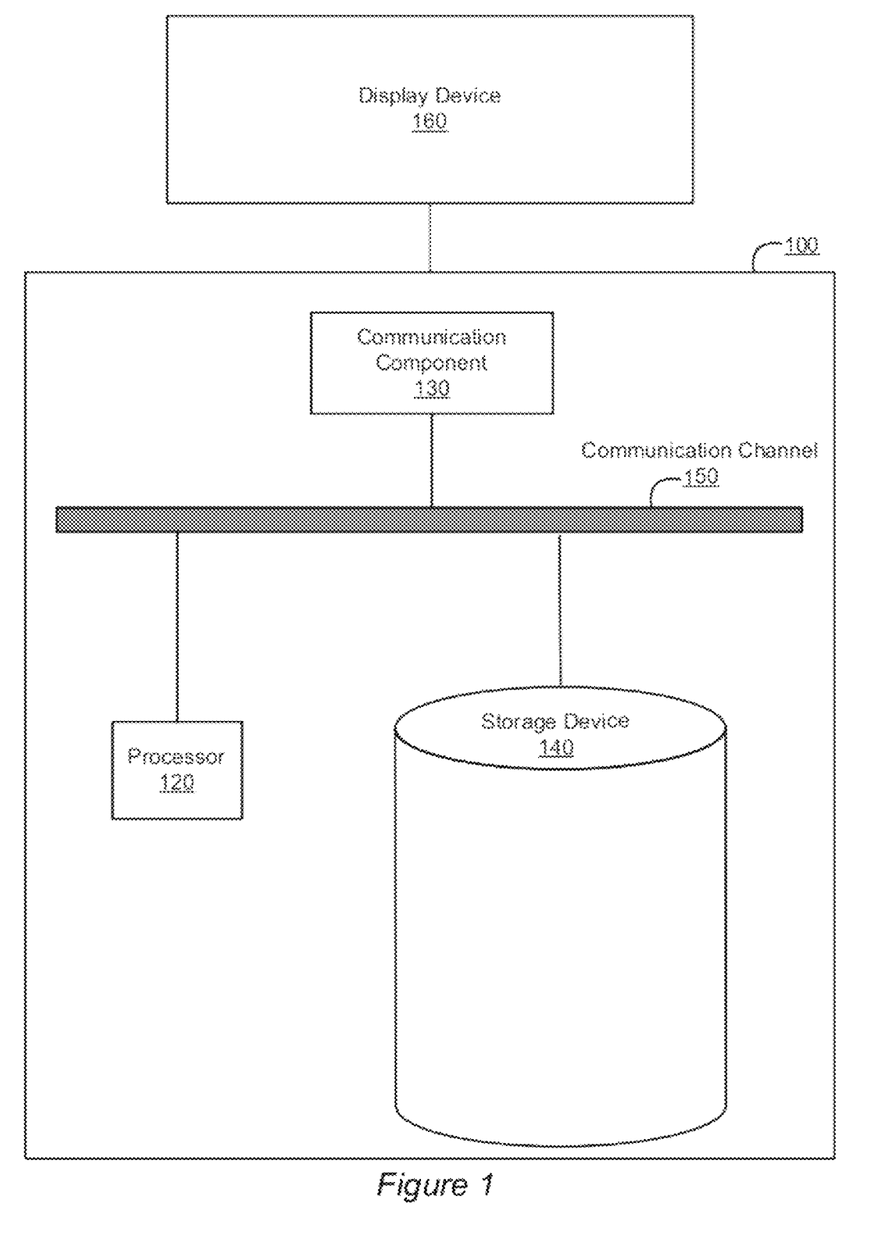
FIG. 1 illustrates a computing machine coupled to an input/output device according to an embodiment of the invention.

FIG. 1 illustrates a computing machine 100 coupled to an input/output device 160 according to an embodiment of the invention. In one embodiment, the computing machine 100 is a desktop, a laptop, a tablet, a netbook, an all-in-one system, and/or a server. In another embodiment, the computing machine 100 is a GPS, a cellular device, and/or a PDA. In other embodiments, the computing machine 100 is a media device, a radio device, and/or any additional device which can be coupled to an input/output device 160.

As illustrated in FIG. 1, the computing machine 100 is coupled to an input/output device 160 and the computing machine 100 includes a processor 120, a communication component 130, a storage device 140, and a communication channel 150 for the device 100 and/or one or more components of the computing machine 100 to communicate with one another. In one embodiment, the storage device 140 is additionally configured to include a remote application. In other embodiments, the computing machine 100 includes additional components and/or is coupled to additional components in addition to and/or in lieu of those noted above and illustrated in FIG. 1.

As noted above, the computing machine 100 includes a processor 120. The processor 120 sends data and/or instructions to the components of the computing machine 100, such as the communication component 130, the input/output device 160, and the remote application. Additionally, the processor 120 receives data and/or instructions from components of the computing machine 100, such as the communication component 130, the input/output device 160, and the remote application.

The remote application is an application which can be utilized in conjunction with the processor 120 to control or manage an input/output device 160 of the computing machine 100. In one embodiment, the remote application operates as a BIOS of the computing machine 100. In another embodiment, the remote application operates as an operating system of the computing machine 100. In other embodiments, the remote application can be or operate as a firmware and/or a driver of the input/output device 160.

For the purposes of this application, an input/output device 160 is a component or device which can be configured to receive, input, and/or output content or information to and/or from the computing machine 100. In one embodiment, the input/output device 160 is a keyboard or a mouse. In another embodiment, the input/output device 160 is a display device. The display device is a device which can be configured by the computing machine 100 to create, render, and/or project one or more images and/or videos for display. In one embodiment, the display device is a monitor and/or television. In other embodiments, the display device is a projector.

When managing the input/output device 160, the processor 120 and/or the remote application can initially detect, receive, and/or send a request to remotely connect the computing machine 100 with a device. For the purposes of this application, the device can be any computing machine, device, and/or component which can remotely connect with the computing machine 100. Additionally, the request can be sent as a file, a signal, and/or as a packet. Further, the request can be sent by the computing machine 100 to the device or the request can be sent by the device to the computing machine 100.

In response to sending or receiving the request, the processor 120 and/or the remote application can proceed to establish a remote connection between the computing machine 100 and the device. For the purposes of this application, a remote connection is established between the computing machine 100 and the device if the device remotely couples and interfaces with the computing machine 100 to use and/or share resources between the device and the computing machine 100. When using and/or sharing resources, the device can access and/or utilize one or more components of computing machine 100. In one embodiment, when establishing a remote connection between the device and the computing machine 100, a remote desktop session is established and the device can log into a user account of the computing machine 100.

Once a remote connection has been established between the computing machine and the device, the processor 120 and/or the remote application proceed to detect a signal to power down the input/output device 160. The signal can be sent as an instruction to the computing machine 100 from the device. In another embodiment, the signal is generated by the processor 120 or the remote application in response to establishing the remote connection.

In response to detecting the signal, the input/output device 160 can transition from a first power state to a second power state. For the purposes of this application, the input/output device 160 can include one or more power states. Additionally, the input/output device 160 can be in a first power state when the input/output device 160 is powered on. Further, the input/output device 160 can be in a second power state when the input/output device 160 is powered off, when the input/output device 160 is in a sleep state, and/or when the input/output device 160 is in a hibernation state.

In other embodiments, the input/output device 160 can include additional power states and the input/output device 160 can transition between the first power state, the second power state, and/or any additional power states in response to detecting the signal. In response to the input/output device 160 transitioning between one or more of the power states, an amount of power consumed by the input/output device 160 can be managed by powering down the input/output device 160 in response to the computing machine 100 remotely connecting to a device.

The remote application can be firmware which is embedded onto the processor 120, the computing machine 100, and/or the storage device 140. In another embodiment, the remote application is a software application stored on the computing machine 100 within ROM or on the storage device 140 accessible by the computing machine 100. In other embodiments, the remote application is stored on a computer readable medium readable and accessible by the remote application 100 or the storage device 140 from a different location.

Additionally, in one embodiment, the storage device 140 is included in the computing machine 100. In other embodiments, the storage device 140 is not included in the computing machine 100, but is accessible to the computing machine 100 utilizing a network interface included in the computing machine 100. The network interface can be a wired or wireless network interface card. In other embodiments, the storage device 140 can be configured to couple to one or more ports or interfaces on the computing machine 100 wirelessly or through a wired connection.

In a further embodiment, the remote application is stored and/or accessed through a server coupled through a local area network or a wide area network. The remote application communicates with devices and/or components coupled to the computing machine 100 physically or wirelessly through a communication bus 150 included in or attached to the computing machine 100. In one embodiment the communication bus 150 is a memory bus. In other embodiments, the communication bus 150 is a data bus.

As noted above, the processor 120 can be utilized in conjunction with the remote application to detect and/or send a request to establish a remote connection between the device and the computing machine 100. When detecting or sending a request, the processor 120 and/or the remote application can instruct the communication component 130 to detect, scan for, and/or send the request to remotely connect. The communication component 130 is a device configured to establish a remote connection between the computing machine 100 and the device by coupling and interfacing the computing machine 100 with the device.

Figure 2:
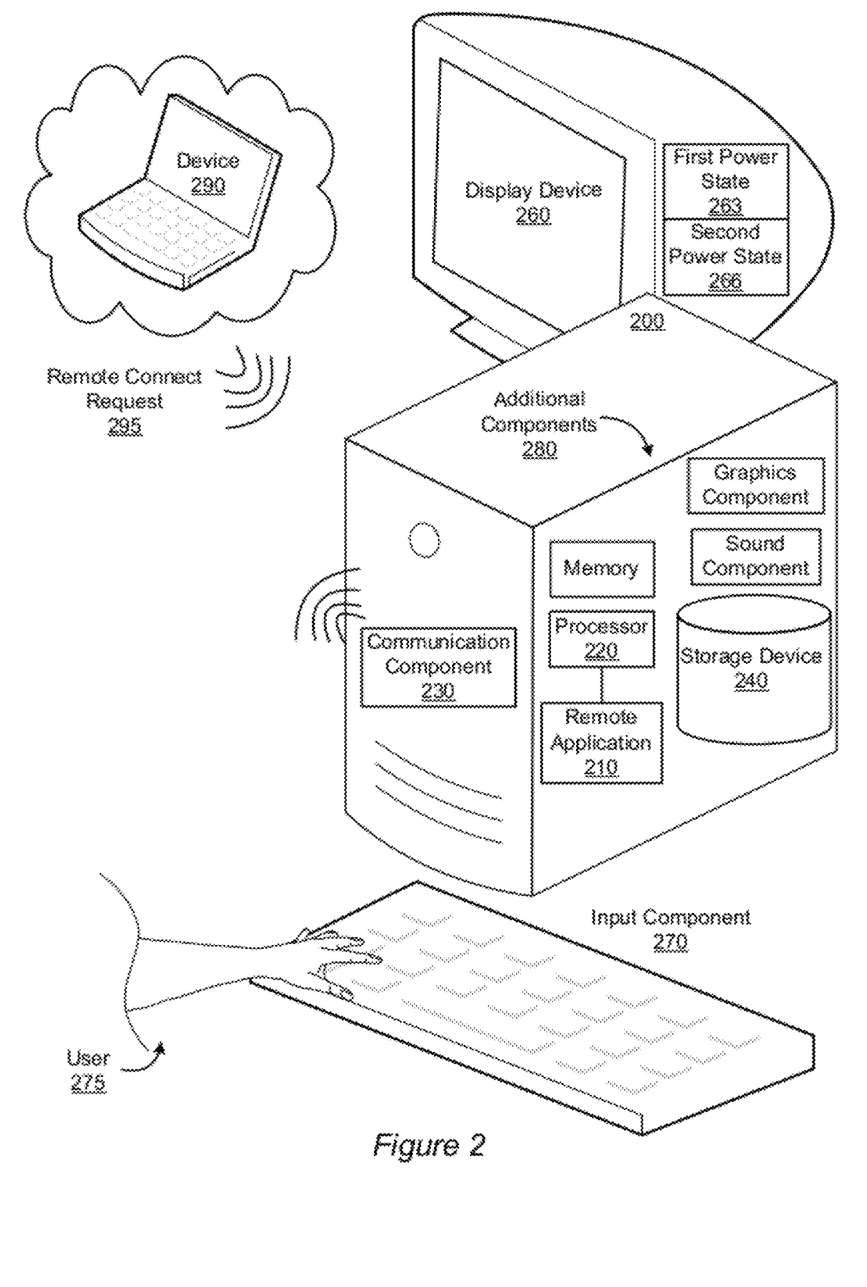
FIG. 2 illustrates a communication component of a computing machine remotely connecting the computing machine to a device according to an embodiment of the invention.

FIG. 2 illustrates a communication component 230 of a computing machine 200 remotely connecting the computing machine 200 to a device 290 according to an embodiment of the invention. As shown in the present embodiment, a device 290 can be a laptop which can communicate with the computing machine 200 from a location outside of an environment or location of the computing machine 200.

In another embodiment, the device 290 can be a desktop, a tablet, a netbook, an all-in-one system, a server, a cellular device, a PDA, a media device, and/or any additional device which couples and interfaces with the communication component 230 when remotely connecting with the computing machine 200. Additionally, the device 290 can include one or more ports or interfaces utilized by the device 290 to couple and interface with the communication component 230. One or more ports or interfaces can include one or more components configured to establish a physical or wireless connection with the communication component 230.

As illustrated in FIG. 2, the communication component 230 is a device of the computing machine 200 which can couple and interface the device 290 with the computing machine 200. Additionally, the communication component 230 can be coupled to one or more locations of the computing machine 200. In another embodiment, the communication component 230 can be integrated as part of the computing machine 200. In other embodiments, the communication component 230 can be coupled or integrated to one or more additional components 280 of the computing machine 200.

The communication component 230 and a port or interface of the device 290 can include a wireless radio device, a wireless LAN device, a Bluetooth device, and/or an infrared device. In another embodiment, communication component 230 can include one or more ports. One or more of the ports of the computing machine 200 or the device 290 can include a USB device, a serial device, a SATA device, an ESATA device, a Firewire device, a port replicator, and/or a network interface device. In other embodiments, the communication component 230 and a port or interface of the device 290 can include additional devices or components configured to remotely connect the device 290 with the computing machine 200.

The processor 220 and/or the remote application 210 can initially send one or more instructions for the communication component 230 to detect a remote connect request 295. In another embodiment, the processor 220 and/or the remote application 210 can generate the remote connect request 295 and instruct the communication component 230 to send the device 290 the remote connection request 295. The remote connect request 295 is an instruction prompting the device 290 and/or the computing machine 200 to establish a remote connection with one another. As noted above, the remote connect request 295 can be sent as a file, a signal, and/or as a packet.

In one embodiment, if the remote connect request 295 is sent by the device 290, the communication component 230 can detect or actively scan for the remote connect request 295. In response to detecting or receiving the remote connect request 295, the communication component 230 can notify the processor 220 and/or the remote application 210 that a remote connection request 295 has been received from the device 290. The processor 220 and/or the remote application 210 will then establish a remote connection with the device 290 by instructing the communication component 230 to couple and interface with the device 290.

In another embodiment, the processor 220 and/or the remote application 210 can send the remote connect request 295 by configuring the communication component 230 to send and/or broadcast the remote connect request 295 to the device 290. In response to receiving a remote connect request 295 from the computing machine 200, the device 290 can proceed to establish a remote connection with the computing machine 200 by coupling and interfacing with the communication component 230.

When the device 290 and/or the computing machine 200 are establishing the remote connection, the remote connection can be established as a virtual network connection, local area network connection, a wireless local area network connection, a wide area network connection, a wireless wide area network connection, an IrDA connection, and/or a Bluetooth connection. In another embodiment, when establishing the remote connection, a remote desktop connection can be established between the device 290 and the computing machine 200. In other embodiments, additionally connection types can be established by the device 290 and/or the computing machine 200 in addition to and/or in lieu of those noted above.

In response to a remote connection being established between the device 290 and the computing machine 200, the processor 220 and/or the remote application 210 can proceed to detect a signal to power down one or more components of the computing machine 200. In one embodiment, the signal can include an instruction to power down the input/output device 260 of the computing machine 200. In another embodiment, the signal can include an instruction to power down one or more additional components 280 of the computing machine 200.

One or more of the signals to power down a component of the computing machine 200 can be generated and sent by the device 290 and received by the communication component 230. Additionally, one or more signals can be sent as a file, a packet, and/or an instruction. In another embodiment, one or more of the signals can be stored on the computing machine 200 and detected by the processor 220 and/or the remote application to execute in response to the computing machine 200 remotely connecting with the device 290. A signal can list one or more components of the computing machine 200 to power down when the computing machine 200 is remotely coupled to the device 290.

In one embodiment, the processor 220 and/or the response application 210 initially detect a signal to power down the input/output device 260. As illustrated in the present embodiment, the input/output device 260 can be a display device. As a result, the processor 220 and/or the remote application 210 can proceed to power down the display device 260 by transitioning the display device 260 from a first power state 263 to a second power state 266.

As shown in FIG. 2, the input/output device 260 includes one or more power states. The input/output device 260 can enter and/or transition between one or more of the power states upon instruction by the processor 220 and/or the remote application 210. In another embodiment, the input/output device 260 can automatically enter and/or transition between or one or more of the power states in response to the computing machine 200 remotely connecting to the device 290. As noted above, one or more of the power states can include a power on state, a power off state, a sleep state, and/or a hibernate state.

When the input/output device 260 is in a first power state 263, the input/output device 260 can be powered on. As a result, if the input/output device 260 is a display device, the display device can be configured to display one or more images and/or videos. Additionally, when the input/output device 260 is in a second power state 266, the input/output device 260 can be powered off, the input/output device 260 can be in a sleep state, or the input/output device 260 can be in a hibernate state. As a result, if the input/output device 260 is a display device, the display device 260 does not render any images and/or videos.

In response to the input/output device 260 transitioning into the second power state 266, the input/output device 260 uses less power as opposed to when the input/output device 260 is in the first power state 263. Additionally, while the computing machine 200 is remotely connected to the device 290, additional instructions to power down additional components 280 of the computing machine 200 can be detected. If the processor 220 and/or the remote application 210 detect one or more instructions to power down any additional components 280 of the computing machine 200, the processor 220 and/or the remote application 210 can identify one or more additional components 280 listed to be powered down from the instruction.

As illustrated in FIG. 2, an additional component 280 of the computing machine 200 can include a memory, the processor 220, the remote application 210, a graphics component, a sound component, and/or the storage device 240. In response to identifying one or more additional components 280 to power down, the processor 220 and/or the remote application 210 proceed to power down one or more of the additional components 280 by configuring any additional components 280 to transition between one or more power states. Similar to the input/output device 260, one or more of the additional components 280 can include a first power state, when the additional component 280 is power on, and a second power state, when the additional component 280 is powered off or when the additional component 280 is in a sleep hibernation state.

Additionally, once the input/output device 260 and/or any additional components 280 have powered down, the input/output device 260 and/or any additional components 280 can enter and/or transition from a second power state 266 to a first power state 263 in response to a user 275 interacting with the computing machine 200. The user can be any person which an input component 270 of the computing machine 200 can detect to be interacting with the computing machine 200.

In one embodiment, the input component 270 can be a keyboard, a mouse, and/or a sensor. The sensor can include a camera, a microphone, and/or a proximity sensor. When detecting the user 275 interacting with the computing machine 200, the input component 270 can detect the user 275 physically accessing the input component 270 or another component of the computing machine. In another embodiment, the input component 270 can detect or scan for the user 275 interacting with the input component 270 and/or the computing machine 200. In response to detecting the user 275 interacting with the input component 270 or the computing machine 200, the input/output device 260 and/or any additional component 280 of the computing machine 200 can transition from the second power state 266 to the first power state 263.

Figure 3:
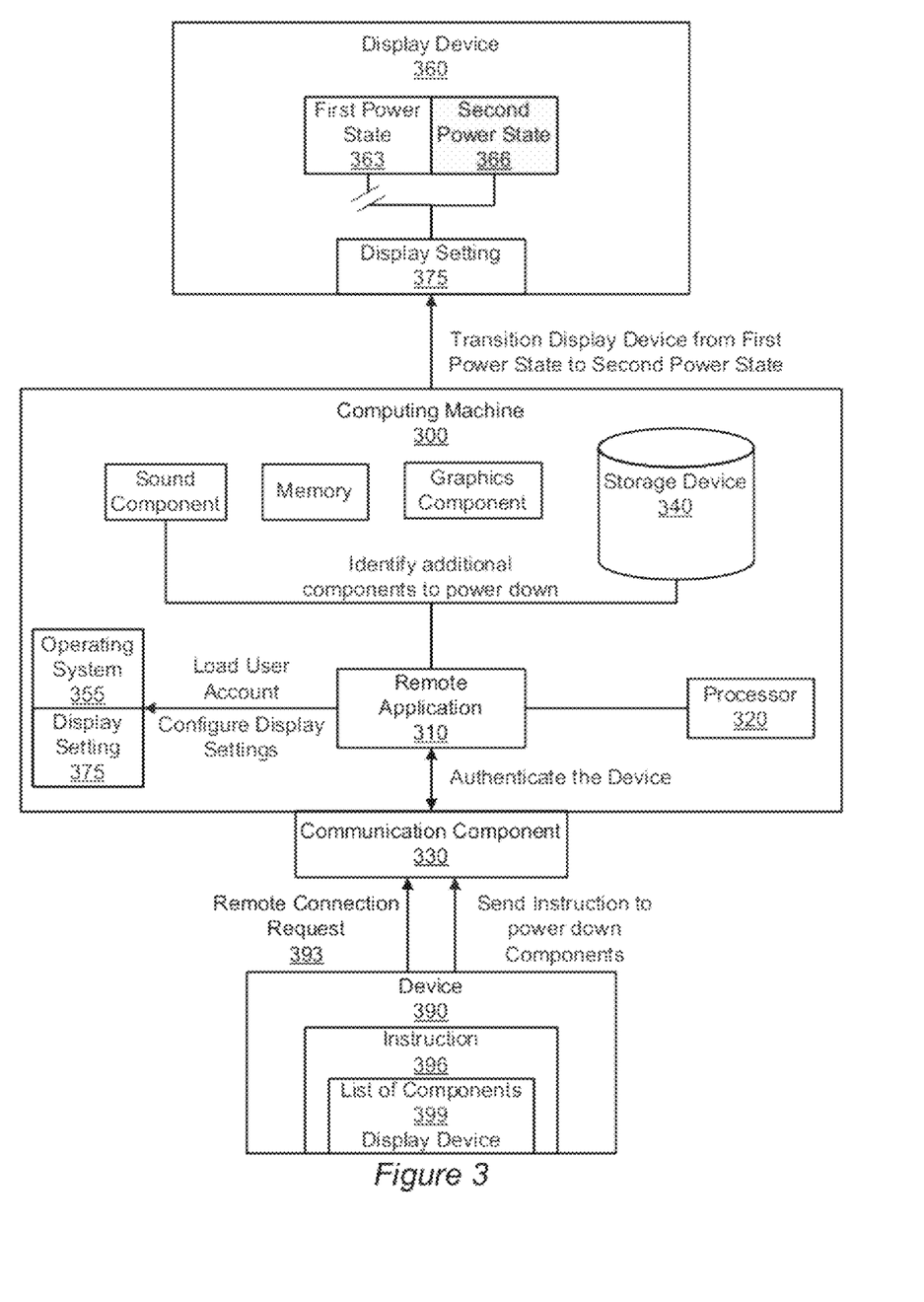
FIG. 3 illustrates a block diagram of a remote application transitioning an input/output device from a first power state to a second power state according to an embodiment of the invention.

FIG. 3 illustrates a block diagram of a remote application 310 transitioning an input/output device 360 from a first power state 363 to a second power state 366 according to an embodiment of the invention. As shown in the present embodiment, a communication component 330 of the computing machine 300 has detected a remote connect request 393 from a device 390. In response to receiving the request, the remote application 310 and/or the processor 320 proceed to establish a remote connection between the computing machine 300 and the device 390.

In one embodiment, the remote application 310 and/or the processor 320 additionally establish a remote desktop connection between the device 390 and the computing machine 300 when remotely connecting the device 390 to the computing machine 300. When establishing the remote desktop connection, the remote application 310 and/or the processor 320 can load a user account of an operating system 355 of the computing machine 300 for the device 390 to use.

In another embodiment, the computing machine 300 can initially be encrypted and the remote application 310 and/or the processor 320 additionally authenticate the device 390 before establishing the remote connection. When authenticating the device 390, the remote application and/or the processor 320 can prompt the device 390 to identify itself or provide a security key.

The remote application 310 and/or the processor 320 will then compare the identity of the device 390 to an approved list of devices to determine whether to establish the remote connection or the remote application 310 and/or the processor 320 will determine if the security key unlocks the encryption of the computing machine 300 before establishing the remote connection. In another embodiment, the remote application 310 and/or the processor 320 can prompt the device 390 or a user of the device 390 to login into a user account of the computing machine 300 before granting access to the computing machine 300 and establishing the remote connection.

As illustrated in FIG. 3, once the remote connection has been established, the device 390 proceeds to send a signal 396 to power down one or more components. The signal 396 can be sent as a file or an instruction and can include a list of components 399 for the computing machine 300 to power down while the device 390 is remotely connected to the computing machine 300. In response to receiving the signal 396, the remote application 310 and/or the processor 320 proceed to identify and power down one or more components of the computing machine 300 to power down.

As shown in the present embodiment, the list of components 396 lists for the input/output device 360 to be powered down. In response, the remote application 310 and/or the processor 320 proceed to power down the input/output device 360. In other embodiments, additional components of the computing machine 300 can be listed in the instruction 396 to be powered down and the remote application 310 and/or the processor 320 can proceed to power down one or more additional components.

As illustrated in FIG. 3, when powering down the input/output device 360, the remote application 310 and/or the processor 320 can configure one or more input/output settings 375 on the computing machine 300. In another embodiment, one or more of the input/output settings 375 can be stored on the input/output device 360. When configuring one or more of the input/output settings 375, the remote application 310 and/or the processor 320 can modify, overwrite, and/or select one or more values or fields in the input/output settings 375.

In one embodiment, one or more input/output settings 375 include values and/or power settings for the input/output device 360. Additionally, the input/output settings 375 can include a first power state 363 and a second power state 366. As illustrated in FIG. 3, when configuring the input/output device 360 to power down, the remote application 310 and/or the processor 320 can select the second power state 366 of the input/output settings 375. In response, the input/output device 360 transitions from the first power state 363 to the second power state 366. In another embodiment, when powering down a component, the remote application 310 and/or the processor 320 can disable the component.

In another embodiment, the operating system 355 or a BIOS of the computing machine 300 can include one or more power management options which can be enabled when powering down or powering up one or more components of the computing machine 300. A power management option can instruct the input/output device 360 and/or one or more additional components to power down in response to a remote connection being established. Additionally, the power management option can instruct the input/output device 360 and/or one or more additional components to power up in response to a user interacting with the computing machine 300 and/or in response to the remote connection terminating.

Figure 4:
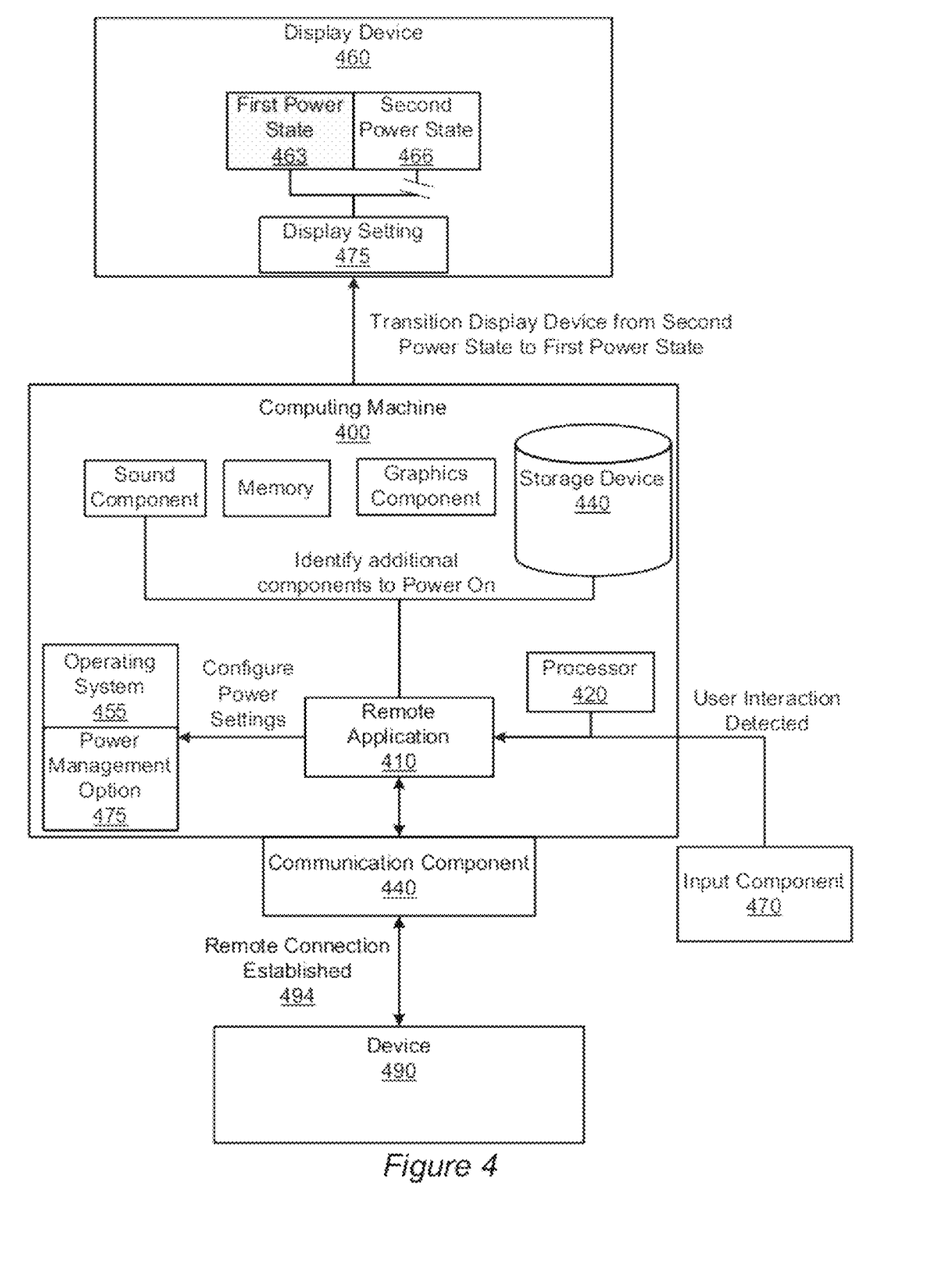
FIG. 4 illustrates a block diagram of a remote application transitioning an input/output device from a second power state to a first power state according to an embodiment of the invention.

FIG. 4 illustrates a block diagram of a remote application 410 transitioning an input/output device 460 from a second power state 466 to a first power state 463 according to an embodiment of the invention. As shown in the present embodiment, a remote connection is currently established between the device 490 and the computing machine 400. Additionally, an input device 470 of the computing machine 400 has detected a user interaction and has notified the remote application 410 and/or the processor 420 that an interaction has been detected.

As noted above, the input component 470 can detect a user interacting with the input component 470 and/or one or more additional components of the computing machine 400. In response to detecting a user interacting with the computing machine 400, the remote application 410 and/or the processor 420 proceed to configure one or more components of the computing machine 400 to power on. As illustrated in FIG. 4, the remote application 410 and/or the processor 420 can access a power management option 475 of the operating system to configure the power settings of one or more components.

As noted above, the power management option 475 can specify for the input/output device 460 to power on in response to a user interacting with the computing machine 400. As a result, the remote application 410 and/or the processor 410 proceed to access the input/output device 460 and transition the input/output device 460 from the second power state 466 to the first power state 463. In response to transitioning to the first power state 463, the input/output device 460 can be powered on for use by the user.

In other embodiments, the remote application 410 and/or the processor 420 additionally identify additional components of the computing machine 400 to power up in response to the input component 470 detecting a user interacting with the computing machine 400. When determining which components to power on, the remote application 410 and/or the processor 420 can access the power management option 475 and determine which components are listed to be enabled and/or powered on in response to the user interacting with the computing machine 400. In response to identifying one or more additional components to power on, the remote application 410 and/or the processor 420 can instruct or configure the corresponding components to transition between one or more power states.

Figure 5:
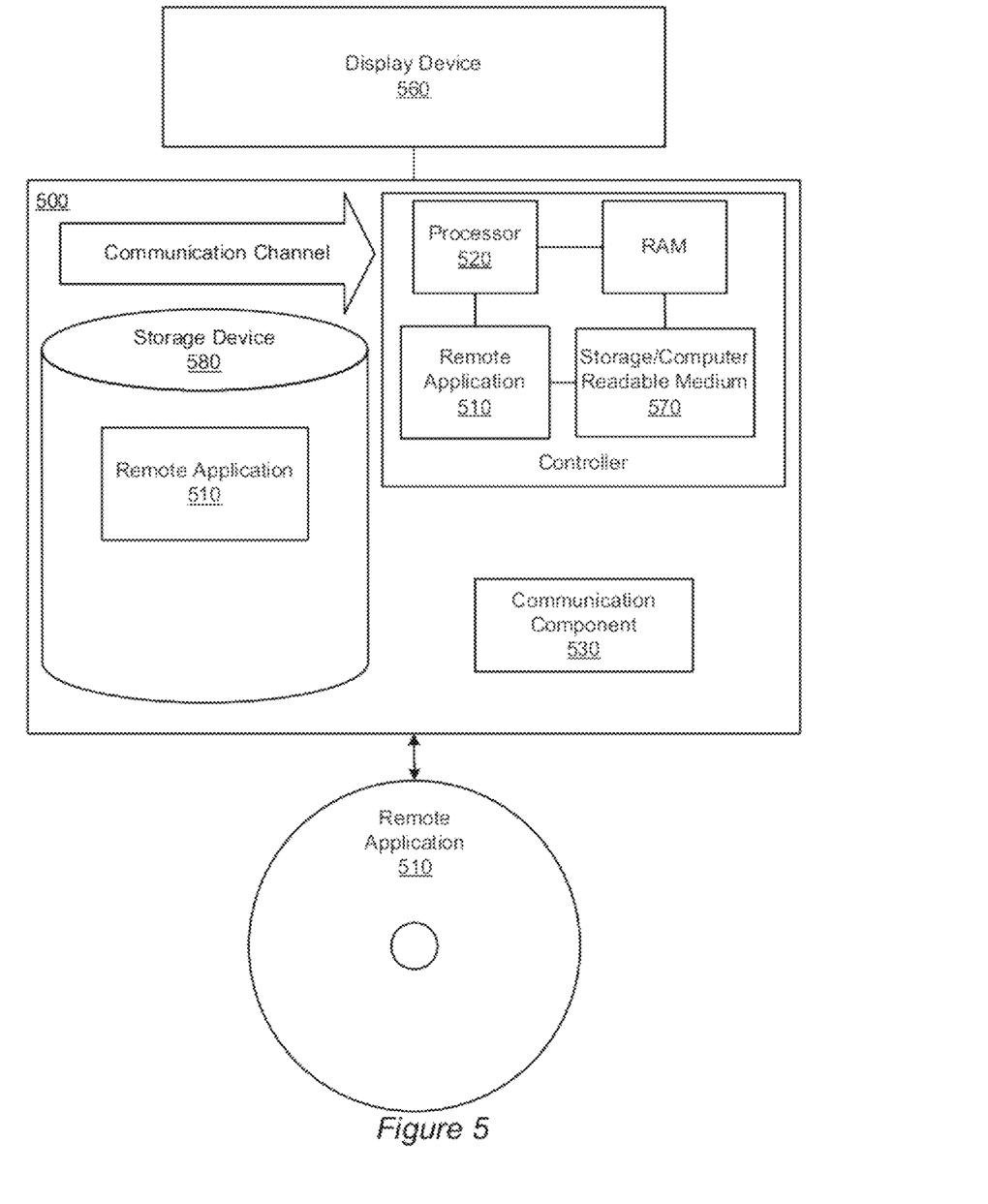
FIG. 5 illustrates a remote application on a computing machine and a remote application stored on a removable medium being accessed by the computing machine according to an embodiment of the invention.

FIG. 5 illustrates a computing machine 500 with a remote application 510 and a remote application 510 stored on a removable medium being accessed by the computing machine 500 according to an embodiment of the invention. For the purposes of this description, a removable medium is any tangible apparatus that contains, stores, communicates, or transports the application for use by or in connection with the computing machine 500. As noted above, in one embodiment, the remote application 510 is firmware that is embedded into one or more components of the computing machine 500 as ROM. In other embodiments, the remote application 510 is a software application which is stored and accessed from a hard drive, a compact disc, a flash disk, a network drive or any other form of computer readable medium that is coupled to the computing machine 500.

Figure 6:
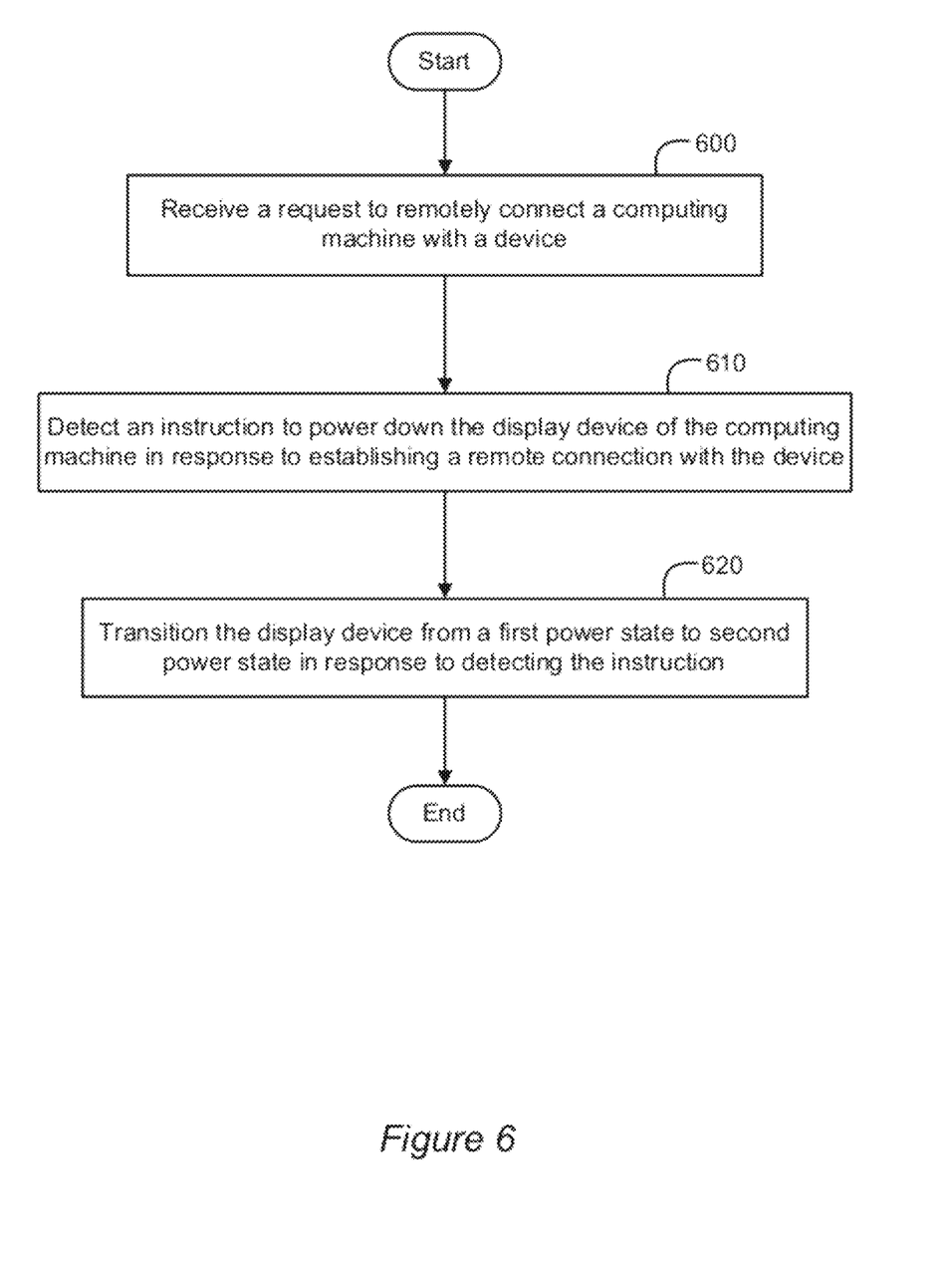
FIG. 6 is a flow chart illustrating a method for managing an input/output device according to an embodiment of the invention.

FIG. 6 is a flow chart illustrating a method for managing an input/output device according to an embodiment of the invention. The method of FIG. 6 uses a device with a processor, a communication component, a communication channel, a storage device, an input/output device, and a remote application. In other embodiments, the method of FIG. 6 uses additional components and/or devices in addition to and/or in lieu of those noted above and illustrated in FIGS. 1, 2, 3, 4, and 5.

As noted above, the remote application is an application which can independently or in conjunction with the processor manage the input/output device. The input/output device is a component or device which can receive, input, and/or output information or content. In one embodiment, the input/output device is a display device and the display device is configured to output one or more images and/or videos.

Additionally, the input/output device can include one or more input/output settings. In another embodiment, one or more input/output settings for the input/output device can be stored on the computing machine. One or more input/output settings can include a first power state and a second power state. Additionally, the input/output device can transition between one or more of the power states in response to a device remotely connecting to the computing machine.

As noted above, a remote connection can be established between the computing machine and the device in response to a remote connect request being sent from the device or the computing machine. Additionally, the computing machine and the device can use and/or share resources from one another during the remote connection. In one embodiment, the processor and/or the remote application generate the remote connect request and configure the communication component of the computing machine to send the device the request. In response to receiving the request, the device can proceed to initiate a remote connection with the computing machine.

In another embodiment, the communication component can receive the request to remotely connect the computing machine with the device 600. When receiving the remote connect request, the communication component can detect the request or scan for the request. As noted above, the communication component is a communication device configured to couple and interface with the device when the device and the computing machine remotely connect with one another. In one embodiment, the communication component establishes a physical connection between the computing machine and the device. In another embodiment, the communication component and the device can include one or more wireless devices configured to wirelessly couple and interface with one another when the device and the computing machine connect.

As noted above, before establishing a remote connection with the device, the processor and/or the remote application can additionally authenticate the device by prompting the device to identify itself, prompting the device to decrypt an encryption of the computing machine, and/or prompting a user of the device to login into a user account of the computing machine. Once the device has been authenticated, the processor and/or the remote application can proceed to establish the remote connection between the device and the computing machine. In one embodiment, the processor and/or the remote application additionally establish a remote desktop connection and load a user account of the computing machine.

Additionally, once the remote connection has been established, the processor and/or the remote connection can detect a signal to power down one or more components of the computing machine 610. In one embodiment, the instruction can be sent from the device and the instruction can include a list of one or more components to power down. One or more of the listed components can include the input/output device of the computing machine. In another embodiment, additional components of the computing machine can be listed to be powered down by the instruction.

In another embodiment, an operating system of the computing machine can include one or more power management settings which can be enabled in response to the computing machine remotely connecting to the device. The power management settings can specify one or more components of the computing machine to power down in response to the computing machine remotely connecting with the device. Additionally, the power management settings can specify one or more components to power on in response to a user interacting with the computing machine or when the remote connection terminates. Further, the power management option can generate the signal and the list of components for the processor and/or the remote application to detect.

In response to detecting the signal, the processor and/or the remote application will proceed to power down the input/output device and/or one or more additional listed components. In one embodiment, when powering down the input/output device, the input/output device can transition from a first power state to a second power state 620. As noted above, one or more input/output settings of the input/output device can include a first power state and a second power state which can be selected and/or overwritten.

When in the first power state, the input/output device can be powered on. Additionally, if the input/output device is a display device, the display device can render one or more images and/or videos. Further, when in the second power state, the input/output device can be powered off or the input/output device can be in a sleep or hibernation state. Further, if the input/output device is a display device, the display device does not display any images and/or videos.

As noted above, when the input/output device is powered down, the input/output device uses less power as opposed to when the input/output device is powered on. In another embodiment, when powering down the input/output device or any additional components, the processor and/or the remote application can disable the input/output device or any additional components listed to be powered down. Once the input/output device has been powered down, the processor and/or the remote application can repeat this method for any additional components listed to be powered down. In other embodiments, the method of FIG. 6 includes additional steps in addition to and/or in lieu of those depicted in FIG. 6.

Figure 7:
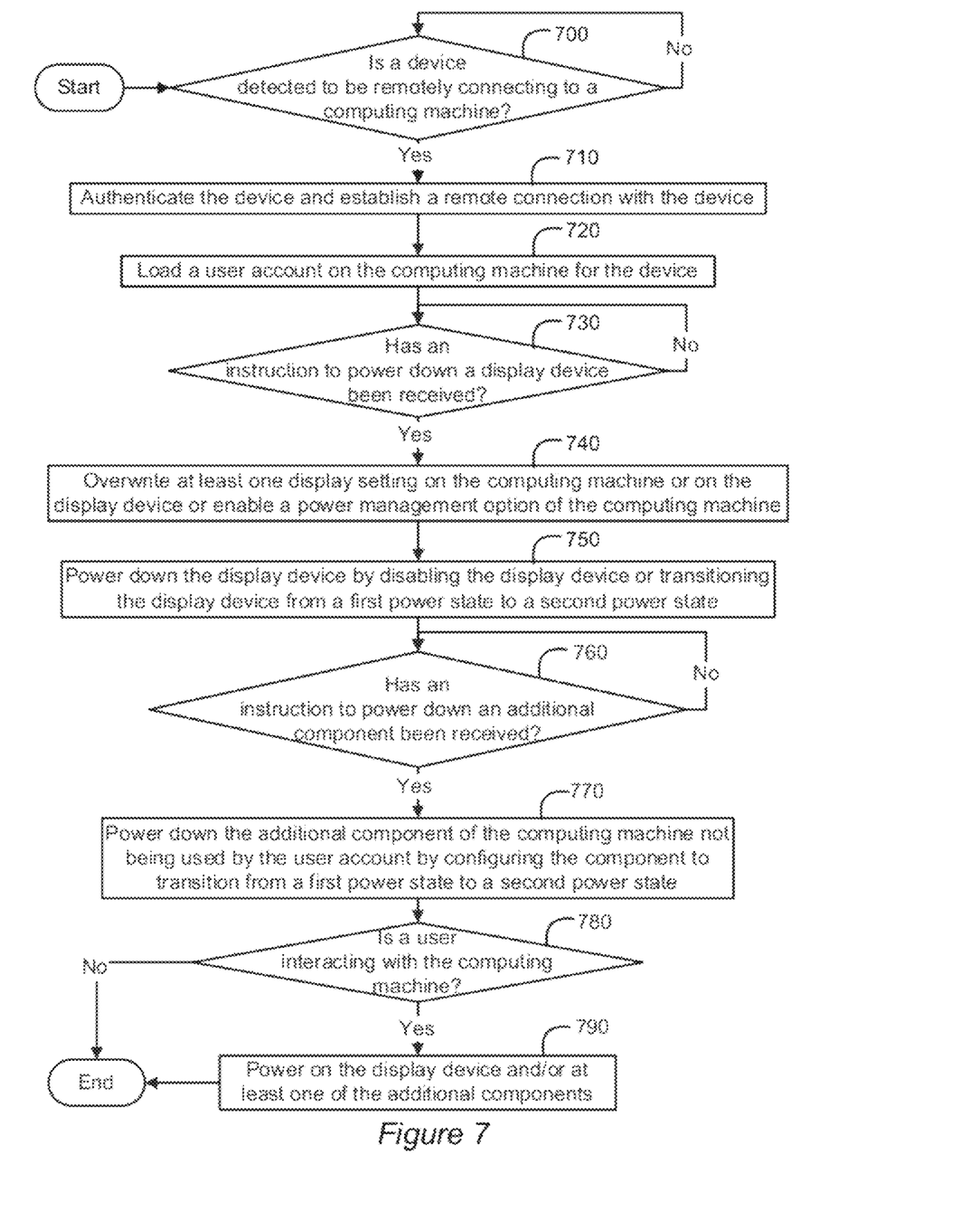
FIG. 7 is a flow chart illustrating a method for managing an input/output device according to another embodiment of the invention.

FIG. 7 is a flow chart illustrating a method for managing an input/output device according to another embodiment of the invention. Similar to the method disclosed above, the method of FIG. 7 uses a device with a processor, a communication component, a communication channel, a storage device, an input/output device, and a remote application. In other embodiments, the method of FIG. 7 uses additional components and/or devices in addition to and/or in lieu of those noted above and illustrated in FIGS. 1, 2, 3, 4, and 5.

As noted above, the processor and/or the remote application can initially determine whether a device is remotely connecting to the computing machine 700. As noted above, a communication component of the computing machine can detect a remote connect request from the device or the communication component can actively scan for the remote connect request. In response to detecting the request, the communication component will notify the processor and/or the remote application and the processor and/or the remote application will proceed to remotely connect the computing machine with the device.

In another embodiment, the processor and/or the remote application will generate the request to remotely connect and instruct the communication component to send or broadcast the request to the device. In response to detecting the request, the device proceeds to initiate the remote connection. If no remote connection is being requested or established, the processor and/or the remote application will continue to detect for the device remotely connecting to the computing machine 700. In one embodiment, the processor and/or the remote application will additionally authenticate the device before establishing a remote connection with the device 710.

As noted above, when authenticating the device, the processor and/or the remote application can prompt the device to identify itself and the identity of the device can be compared to an approved device list accessible to the processor and/or the remote application. In another embodiment, the device can be instructed to decrypt an encryption of the computing machine. In other embodiments, the computing machine can load a remote desktop connection and the device be prompted to login into a user account of the computing machine.

Once the device has been authenticated, a user account on the computing machine can be loaded by the processor and/or the remote application 720. In response to establishing the remote connection and loading the user account, the processor and/or the remote application can determine whether a signal to power down an input/output device has been received 730. If no instruction to power down a component has been received, the processor and/or the remote application will continue to detect an instruction to power down the input/output device 730. As noted above, an instruction to power down the input/output device can be generated by the device and sent to the computing machine.

In response to detecting the instruction to power down the input/output device, the processor and/or the remote application will proceed to overwrite at least one input/output setting or the processor and/or the remote application will proceed to enable a power management option of the computing machine 740. As noted above, one or more input/output settings for the input/output device can be stored on the computing machine or on the input/output device. Additionally, one or more of the input/output settings can include power settings for the input/output. The power settings can list a first power state and a second power state which can be selected, modified, and/or overwritten by the input/output settings. In other embodiments, additional power states can be included and selected, modified, and/or overwritten in addition to and/or in lieu of those noted above.

In response to overwriting, modifying and/or selecting a input/output setting, the input/output device can power down by transitioning from the first power state to the second power state 750. As noted above, if the input/output device is a display device, when in the first power state, the display device can output one or more images and/or videos. Additionally, if the input/output device is a display device, when in the second power state, the display device does not render any images. Further, when in the second power state, the input/output device consumes less power as opposed to when in the first power state.

In another embodiment, the power management option of the computing machine can be enabled in response to the computing machine remotely connecting to the device or in response to receiving the signal to power down a component. The power management option can list one or more components of the computing machine to power down in response to the remote connection being established. Further, the power management option can list one or more component of the computing machine to power on in response to a user interacting with the computing machine or in response to the remote connection between the computing machine and the device terminating.

In response to enabling the power management option, the processor and/or the remote application will determine to power down the input/output device by transitioning the input/output device from the first power state to the second power state 750. Once the input/output device has been powered down, the processor and/or the remote application will determine whether there are any additional components listed to be powered down 760. When identifying any additional components to power down, the processor and/or the remote application can access the list of components included in the instruction to power down.

In another embodiment, the processor and/or the remote application can access the power management option to identify any additional components listed to be powered down. In other embodiment, the processor and/or the remote application can identify additional components of the computing machine which are not being used in the remote connection by the computing machine or by the device. In response to identifying one or more additional components to power down, the processor and/or the remote application proceed to power down the additional components by configuring the corresponding components to transition from a first power state to a second power state 770.

Once the listed components of the computing machine have been powered down, the processor and/or the remote application detect for a user interacting with the computing machine 780. As noted above, the computing machine can include an input component configured to detect or scan for the user interacting with one or more components of the computing machine. In one embodiment, the input component can include a sensor.

If no user is detected to be interacting with the device, the listed components can remain powered off and the input component continues to detect or scan for a user interacting with the computing machine 780. If a user is detected to be interacting with the computing machine, the processor and/or the remote application proceed to power on the input/output device and/or at least one additional component of the computing machine by transitioning the input/output device or any additional component from the second power state to the first power state 790.

When determining which of the powered off components to power on, the processor and/or the remote application can identify components from the list of components or from the power management option. In another embodiment, the processor and/or the remote application can identify which component the user is interacting with and proceed to power on the corresponding component. The process is then complete or the process can be repeated. In other embodiments, the method of FIG. 7 includes additional steps in addition to and/or in lieu of those depicted in FIG. 7.

What is claimed is:

1. A method for managing an input/output device comprising:

establishing a remote computing session between a first computing machine and a second computing session in response to the first computing machine receiving a request to remotely connect with a second computing machine;

detecting a signal from the second computing machine to power down the input/output device of the first computing machine in response to establishing a remote computing session with the second computing machine; and transitioning the input/output device from a first power state to a lower power state using an operating system of the first computing machine in response to detecting the signal to power down the input/output device.

2. The method for managing an input/output device of claim 1 further comprising authenticating the second computing machine before establishing the remote computing session with the second computing machine.

3. The method for managing an input/output device of claim 1 further comprising overwriting at least one input/output setting of the first computing machine in response to detecting the signal.

4. The method for managing an input/output device of claim 1 further comprising identifying at least one additional component of the first computing machine not being used by the second computing machine.

5. The method for managing an input/output device of claim 4 further comprising configuring at least one of the additional components not being used by the second computing machine to transition from the first power state to the lower power state in response to receiving the signal.

6. The method for managing an input/output device of claim 1 further comprising determining whether a user is interacting with a component of the first computing machine.

7. The method for managing an input/output device of claim 6 further comprising transitioning the input/output device from the lower power state to the first power state in response to a user interacting with a component of the first computing machine.

8. The method for managing an input/output device of claim 1 further comprising loading a user account on the first computing machine for the second computing machine in response to establishing the remote connection.

9. A first computing machine comprising:

a communication component configured to detect a second computing machine remotely connecting to the first computing machine;

an input/output device configured to transition between one or more power states; and a processor to establish a remote computing session between the first computing machine and the second computing session in response to the second computing machine remotely connecting to the first computing machine and transition the input/output device from a first power state to a lower power state using an operating system of the first computing machine in response to detecting an signal from the second computing machine to power down the input/output device.

10. The first computing machine of claim 9 further comprising an input component configured to detect a user interacting with the first computing machine.

11. The first computing machine of claim 10 wherein the input component includes a sensor configured to detect the user accessing at least one from the group consisting of the input/output device, a display device, the input component, and another component of the first computing machine when interacting with the first computing machine.

12. The first computing machine of claim 10 wherein the processor configures the input/output device to transition from the lower power state to the first power state in response to the input component detecting the user interacting with the first computing machine.

13. The first computing machine of claim 9 wherein the communication component includes at least one from the group consisting of an LAN device, a WLAN device, a Bluetooth device, an infrared device, a SATA device, an ESATA device, and a port replicator.

14. The first computing machine of claim 9 wherein the second computing machine transmits a signal for the processor to power down the input/output device in response to establishing a remote computing session with the first computing machine.

15. The first computing machine of claim 9 wherein the processor configures the input/output device to transition between one or more power states by modifying a power setting of the first computing machine.

16. The first computing machine of claim 9 wherein the processor configures the input/output device to transition between one or more power states by modifying an input/output setting of the input/output device.

17. A non-transitory computer-readable medium comprising instructions that if executed by a controller cause the controller to:

remotely connect a first computing machine to a second computing machine to establish a remote computing session between the first computing machine and the second computing machine;

wherein the controller is additionally to detect a signal from the second computing device to power down a input/output device of the first computing machine in response to the remote computing session being established; and wherein the controller is further to transition the input/output device from a first power state to a lower power state with an operating system of the first computing machine in response to detecting the signal from the second computing machine.

18. The non-transitory computer-readable medium of claim 17 wherein the first computing machine includes a power management option configured to transition at least one component of the first computing machine between one or more power states in response to the remote computing session being established.

19. The non-transitory computer-readable medium of claim 18 wherein power management option can be enabled through an operating system of the first computing machine.

20. The non-transitory computer-readable medium of claim 17 wherein the operating system disables the input/output device when transitioning the input/output device between one or more power states.

* * * * *